US012602389B2

(12) United States Patent
Peng

(10) Patent No.: US 12,602,389 B2
(45) Date of Patent: Apr. 14, 2026

(54) RECOMMENDATION WORD DETERMINATION METHOD AND APPARATUS, AND ELECTRONIC DEVICE AND STORAGE MEDIUM

(71) Applicant: BEIJING BYTEDANCE NETWORK TECHNOLOGY CO., LTD., Beijing (CN)

(72) Inventor: Ruiqi Peng, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/848,880

(22) PCT Filed: Mar. 10, 2023

(86) PCT No.: PCT/CN2023/080712
§ 371 (c)(1),
(2) Date: Sep. 19, 2024

(87) PCT Pub. No.: WO2023/202257
PCT Pub. Date: Oct. 26, 2023

(65) Prior Publication Data
US 2025/0209078 A1 Jun. 26, 2025

(30) Foreign Application Priority Data
Apr. 18, 2022 (CN) .......................... 202210405266.9

(51) Int. Cl.
*G06F 7/00* (2006.01)
*G06F 16/2457* (2019.01)
(Continued)

(52) U.S. Cl.
CPC .... *G06F 16/24578* (2019.01); *G06F 16/9535* (2019.01); *G06F 16/9538* (2019.01)

(58) Field of Classification Search
CPC .......... G06F 16/24578; G06F 16/9535; G06F 16/9538
(Continued)

(56) References Cited

U.S. PATENT DOCUMENTS 8,326,862 B2 * 12/2012 Reznik .............. G06F 16/24578
707/732
2009/0288028 A1 * 11/2009 Gohda .................. G06F 3/0486
715/769
(Continued)

FOREIGN PATENT DOCUMENTS

CN        104281699 A        1/2015
CN        105069168 A        11/2015
(Continued)

OTHER PUBLICATIONS

International Patent Application No. PCT/CN2023/080712; Int'l Search Report; dated May 24, 2023; 3 pages.
(Continued)

*Primary Examiner* — Pavan Mamillapalli
(74) *Attorney, Agent, or Firm* — BakerHostetler

(57) ABSTRACT

The present disclosure relates to a recommendation word determination method and apparatus, and an electronic device and a storage medium. The method comprises: receiving a search word, and presenting, on a search result page, a first search result corresponding to the search word under a first attribute tag, and an attribute of the first search result is matched with the first attribute tag; in response to a switching operation for the attribute tags, presenting, a second search result corresponding to the search word under a second attribute tag, wherein an attribute of the second search result is matched with the second attribute tag; and in response to a triggering operation for a search box, presenting a recommendation word set on a search intermediate page, the recommendation word set determined based on the (Continued)

Receive a search word, and present, on a search result page, a first search result corresponding to the search word under a first attribute tag — S10

In response to a switching operation for the attribute tags, present, on the search result page, a second search result corresponding to the search word under a second attribute tag, wherein an attribute of the second search result is matched with the second attribute tag — S20

In response to a triggering operation for a search box on the search result page, present a recommendation word set on a search intermediate page, wherein the recommendation word set is determined based on the search word and the second attribute tag — S30 search word and the second attribute tag. The search experience of a user is improved.

19 Claims, 7 Drawing Sheets

(51) Int. Cl.
    *G06F 16/9535*     (2019.01)
    *G06F 16/9538*     (2019.01)
    *G06F 17/00*     (2019.01)

(58) Field of Classification Search
    USPC ........................................................ 707/727
    See application file for complete search history.

(56)            References Cited

U.S. PATENT DOCUMENTS

| | | | | |
|---|---|---|---|---|
| 2015/0169499 | A1* | 6/2015 | Patel ................. | G06F 16/24575 |
| | | | | 715/273 |
| 2018/0307693 | A1* | 10/2018 | Morikawa ............... | G06F 40/30 |
| 2019/0138615 | A1* | 5/2019 | Huh ...................... | G06F 16/953 |
| 2023/0252103 | A1* | 8/2023 | Lin ........................ | G06F 16/951 |
| | | | | 707/722 |

FOREIGN PATENT DOCUMENTS

| | | | |
|---|---|---|---|
| CN | 105095440 | A | 11/2015 |
| CN | 107832332 | A | 3/2018 |
| CN | 108197242 | A | 6/2018 |
| CN | 108197244 | A | 6/2018 |
| CN | 109543113 | A | 3/2019 |
| CN | 109697256 | A | 4/2019 |
| CN | 109871483 | A | 6/2019 |
| CN | 111368185 | A | 7/2020 |
| CN | 111859195 | A | 10/2020 |
| CN | 112231554 | A | 1/2021 |
| CN | 113177154 | A | 7/2021 |
| CN | 114265981 | A | 4/2022 |
| CN | 114756751 | A | 7/2022 |
| JP | 2000112961 | A | 4/2000 |
| JP | 2011-138223 | A | 7/2011 |
| KR | 20030033497 | A | 5/2003 |
| KR | 20190005494 | A | 1/2019 |

OTHER PUBLICATIONS

Notice of Opinion on the Second Review for Chinese Application No. 202210405266.9, mailed on Nov. 15, 2024, 20 pages with machine-generated translation.

* cited by examiner

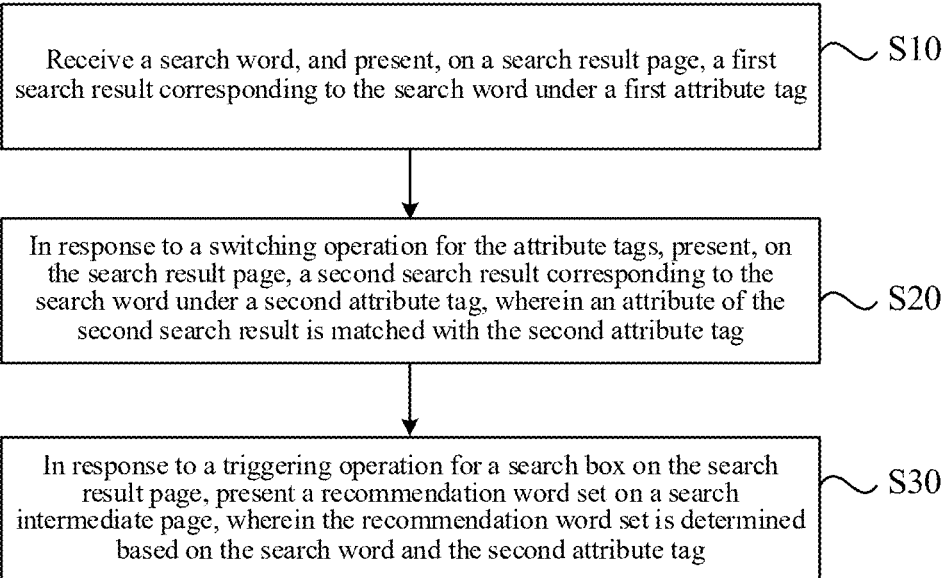

Receive a search word, and present, on a search result page, a first
search result corresponding to the search word under a first attribute tag ⟲ S10

In response to a switching operation for the attribute tags, present, on
the search result page, a second search result corresponding to the
search word under a second attribute tag, wherein an attribute of the
second search result is matched with the second attribute tag ⟲ S20

In response to a triggering operation for a search box on the search
result page, present a recommendation word set on a search
intermediate page, wherein the recommendation word set is determined
based on the search word and the second attribute tag ⟲ S30

Fig.1

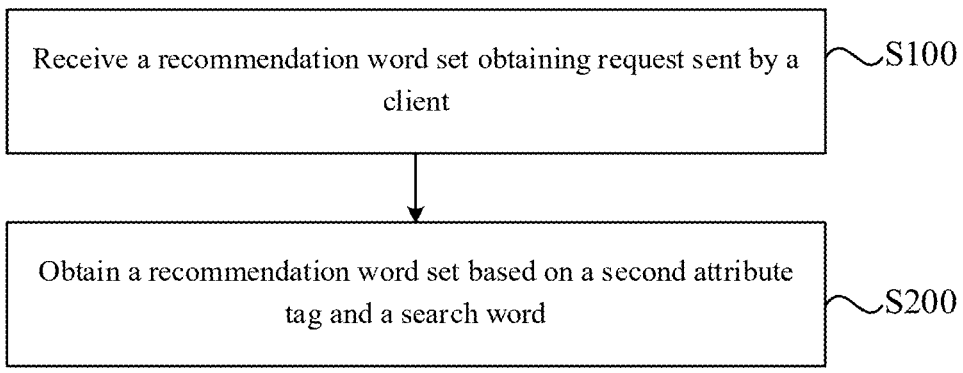

| Receive a recommendation word set obtaining request sent by a client | ~S100 |

↓

| Obtain a recommendation word set based on a second attribute tag and a search word | ~S200 |

Fig.3

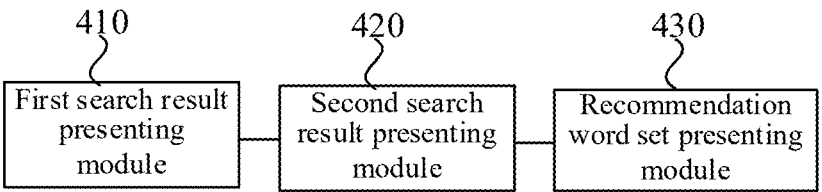

| 410 | 420 | 430 |
| First search result presenting module | Second search result presenting module | Recommendation word set presenting module |

Fig.4

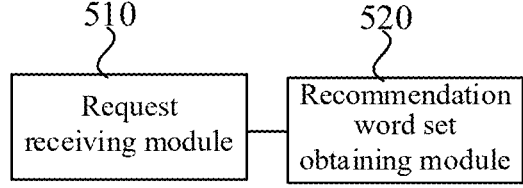

| 510 | 520 |
| Request receiving module | Recommendation word set obtaining module |

Fig.5

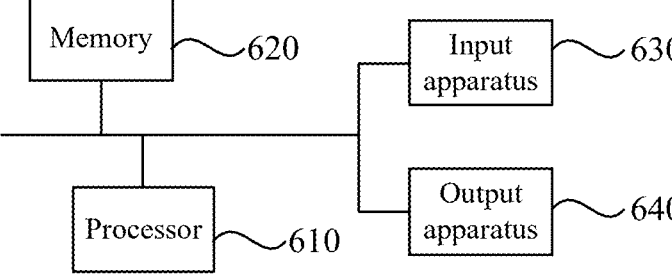

Memory ~620    Input apparatus ~630

Processor ~610    Output apparatus ~640

Fig.6

RECOMMENDATION WORD DETERMINATION METHOD AND APPARATUS, AND ELECTRONIC DEVICE AND STORAGE MEDIUM

CROSS-REFERENCE TO RELATED APPLICATION(S)

This application is a U.S. National Stage Application of PCT Application Serial No. PCT/CN2023/080712, filed Mar. 10, 2023, which claims priority to Chinese Patent Application No. "202210405266.9", entitled "RECOMMENDATION WORD DETERMINATION METHOD AND APPARATUS, AND ELECTRONIC DEVICE AND STORAGE MEDIUM", filed on Apr. 18, 2022, which are incorporated by reference in their entireties.

FIELD

The present disclosure relates to the technical field of search keyword recommendation, and in particular, to a recommendation word determination method and apparatus, and an electronic device and a storage medium.

BACKGROUND

In recent years, with the rapid development of science and technology, the Internet has been widely used in various fields. Big data has an explosive growth. Massive data and information are scattered in a cyberspace. When a user needs to obtain information and data, the user usually uses a search engine to search for the information, thereby obtaining desired search information.

In the prior art, a user clicks on a search box or a magnifying glass on a search page to enter a search intermediate page. The search intermediate page presents search recommendation words to the user. The user can trigger the search recommendation words to search for relevant information.

However, in the prior art, the accuracy of search recommendation words presented to a user on the search intermediate page is relatively low, which cannot meet a search need of the user.

SUMMARY

To solve the above technical problems or at least partially solve the above technical problems, the present disclosure provides a recommendation word determination method and apparatus, and an electronic device and a storage medium, so as to improve the search experience of a user.

In a first aspect, the embodiments of the present disclosure provide a recommendation word determination method, comprising:

receiving a search word, and presenting, on a search result page, a first search result corresponding to the search word under a first attribute tag, wherein the search result page comprises a plurality of attribute tags, and an attribute of the first search result is matched with the first attribute tag;

in response to a switching operation for the attribute tags, presenting, on the search result page, a second search result corresponding to the search word under a second attribute tag, wherein an attribute of the second search result is matched with the second attribute tag; and in response to a triggering operation for a search box on the search result page, presenting a recommendation word set on a search intermediate page, wherein the recommendation word set is determined based on the search word and the second attribute tag.

Optionally, the recommendation word set is determined based on the search word and the second attribute tag, which comprises:

determining an extension word based on the second attribute tag; and performing splicing combination on candidate recommendation words corresponding to the search word, and the extension word, and generating target recommendation words to obtain the recommendation word set.

Optionally, the recommendation word set is determined based on a first recommendation word set corresponding to the search word and a second recommendation word set corresponding to the second attribute tag, which comprises:

obtaining, based on the second attribute tag, a first recommendation word subset from the first recommendation word set, and a second recommendation word subset from the second recommendation word set, wherein recommendation words in the first recommendation word subset and the second recommendation word subset are matched with the second attribute tag; and processing and splicing the recommendation words in the first recommendation word subset and the second recommendation word subset to obtain the recommendation word set.

Optionally, in response to a triggering operation for a search box on the search result page, presenting a recommendation word set on a search intermediate page comprises:

in response to a trigger for a focus of the search box on the search result page, presenting the recommendation word set on the search intermediate page; or in response to a deletion of the search word from the search box on the search result page, presenting the recommendation word set on the search intermediate page; or in response to a trigger for a target control corresponding to the search box on the search result page, presenting the recommendation word set on the search intermediate page.

Optionally, the method further comprises:

in response to a triggering operation for any target recommendation word in the recommendation word set, presenting, on the search result page, a target search result matched with the target recommendation word and the second attribute tag; or, in response to a triggering operation for any target recommendation word in the recommendation word set, presenting, on the search result page, a target search result matched with the target recommendation word, wherein the target search result comprises third search results corresponding to the target search word under different attribute tags, and a presentation priority of a search result, having an attribute tag matched with the second attribute tag, among the third search results is higher than a presentation priority of a search result, having an attribute tag not matched with the second attribute tag, among the third search results.

In a second aspect, the embodiments of the present disclosure provide another recommendation word determination method, comprising:

receiving a recommendation word set obtaining request sent by a client, wherein the recommendation word set obtaining request comprises a second attribute tag and a search word, and the recommendation word set obtaining request is used for requesting to obtain a recommendation word set; and obtaining a recommendation word set based on the second attribute tag and the search word, wherein a recommendation word in the recommendation word set is matched with the second attribute tag.

Optionally, obtaining a recommendation word set based on the second attribute tag and the search word comprises:

obtaining the recommendation word set corresponding to the second attribute tag and the search word from a database based on the second attribute tag and the search word.

Optionally, before obtaining the recommendation word set corresponding to the second attribute tag and the search word from a database based on the second attribute tag and the search word, the method further comprises:

obtaining historical recommendation words comprising the search word; and filtering the historical search words to obtain the recommendation word set matched with the second attribute tag.

Optionally, before obtaining the recommendation word set corresponding to the second attribute tag and the search word from a database based on the second attribute tag and the search word, the method further comprises:

obtaining a historical search result of the search word;

obtaining candidate recommendation words corresponding to the historical search result; and obtaining the recommendation word set matched with the second attribute tag from the candidate recommendation words.

Optionally, obtaining recommendation word set matched with the second attribute tag from the candidate recommendation words based on the second attribute tag comprises:

obtaining the recommendation word set matched with the second attribute tag from the candidate recommendation words based on the second attribute tag and interaction data for the candidate recommendation words.

Optionally, obtaining the recommendation word set matched with the second attribute tag from the candidate recommendation words based on the second attribute tag and interaction data for the candidate recommendation words comprises:

obtaining candidate recommendation word set matched with the second attribute tag from the candidate recommendation words;

determining recommendation parameters for the candidate recommendation words in the candidate recommendation word set based on the interaction data for the candidate recommendation words; and obtaining the recommendation word set from the candidate recommendation word set based on the recommendation parameters for the candidate recommendation words in the candidate recommendation word set.

Optionally, the interaction data comprises a search frequency, a search time period, and/or a browse behavior.

In a third aspect, the embodiments of the present disclosure provide a recommendation word determination apparatus, comprising:

a first search result presenting module, configured to: receive a search word, and present, on a search result page, a first search result corresponding to the search word under a first attribute tag, wherein the search result page comprises a plurality of attribute tags, and an attribute of the first search result is matched with the first attribute tag;

a second search result presenting module, configured to: in response to a switching operation for the attribute tags, present, on the search result page, a second search result corresponding to the search word under a second attribute tag, wherein an attribute of the second search result is matched with the second attribute tag; and a recommendation word set presenting module, configured to: in response to a triggering operation for a search box on the search result page, present a recommendation word set on a search intermediate page, wherein the recommendation word set is determined based on the search word and the second attribute tag.

In a fourth aspect, the embodiments of the present disclosure provide another recommendation word determination apparatus, comprising:

a request receiving module, configured to receive a recommendation word set obtaining request sent by a client, wherein the recommendation word set obtaining request comprises a second attribute tag and a search word, and the recommendation word set obtaining request is used for requesting to obtain a recommendation word set; and a recommendation word set obtaining module, configured to obtain a recommendation word set based on the second attribute tag and the search word, wherein a recommendation word in the recommendation word set is matched with the second attribute tag.

In a fifth aspect, the embodiments of the present disclosure provide an electronic device, comprising:

one or more processors; and a storage apparatus, configured to store one or more programs, wherein the one or more programs, when run by the one or more processors, cause the one or more processors to implement any method as described in the first aspect or the second aspect.

In a sixth aspect, the embodiments of the present disclosure provide a computer-readable storage medium, with a computer program stored thereon. The program, when run by a processor, implements any method as described in the first aspect or the second aspect.

Compared with the related art, the technical solutions provided by the embodiments of the present disclosure have the following advantages:

According to the recommendation word determination method and apparatus, and the electronic device and the storage medium provided by the embodiments of the present disclosure, after receiving a search word, a client presents, on a search result page, a first search result corresponding to the search word under a first attribute tag; in response to a switching operation for attribute tags, presents, on the search result page, a second search result corresponding to the search word under a second attribute tag, wherein an attribute of the second search result is matched with the second attribute tag; and in response to a triggering operation for a search box on the search result page, presents a recommendation word set on a search intermediate page, wherein the recommendation word set is determined based on the search word and the second attribute tag. When a user performs switching to a different attribute tag for searching, a recommendation word set presented on a search result page to the user is associated according to a search need of the user, and the recommendation word set is more related to a search word of the user and switched attribute tags.

BRIEF DESCRIPTION OF THE DRAWINGS

The drawings here are incorporated into and form part of the specification, showing the embodiments that comply with the present disclosure, and are used together with the specification to explain the principles of the present disclosure.

In order to describe the technical solutions in the embodiments of the present disclosure or in the related art more clearly, the following briefly introduces the accompanying drawings for describing the embodiments or the related art. Apparently, a person of ordinary skill in the art may still derive other drawings from the accompanying drawings without creative effort.

FIG. 1 is a flowchart of a recommendation word determination method provided by embodiments of the present disclosure;

FIG. 3 is a flowchart of another recommendation word determination method provided by embodiments of the present disclosure;

FIG. 4 is a schematic structural diagram of a recommendation word determination apparatus provided by embodiments of the present disclosure;

FIG. 5 is a schematic structural diagram of another recommendation word determination apparatus provided by embodiments of the present disclosure; and FIG. 6 is a schematic structural diagram of an electronic device provided by embodiments of the present disclosure.

DETAILED DESCRIPTION OF EMBODIMENTS

Figure 2A:
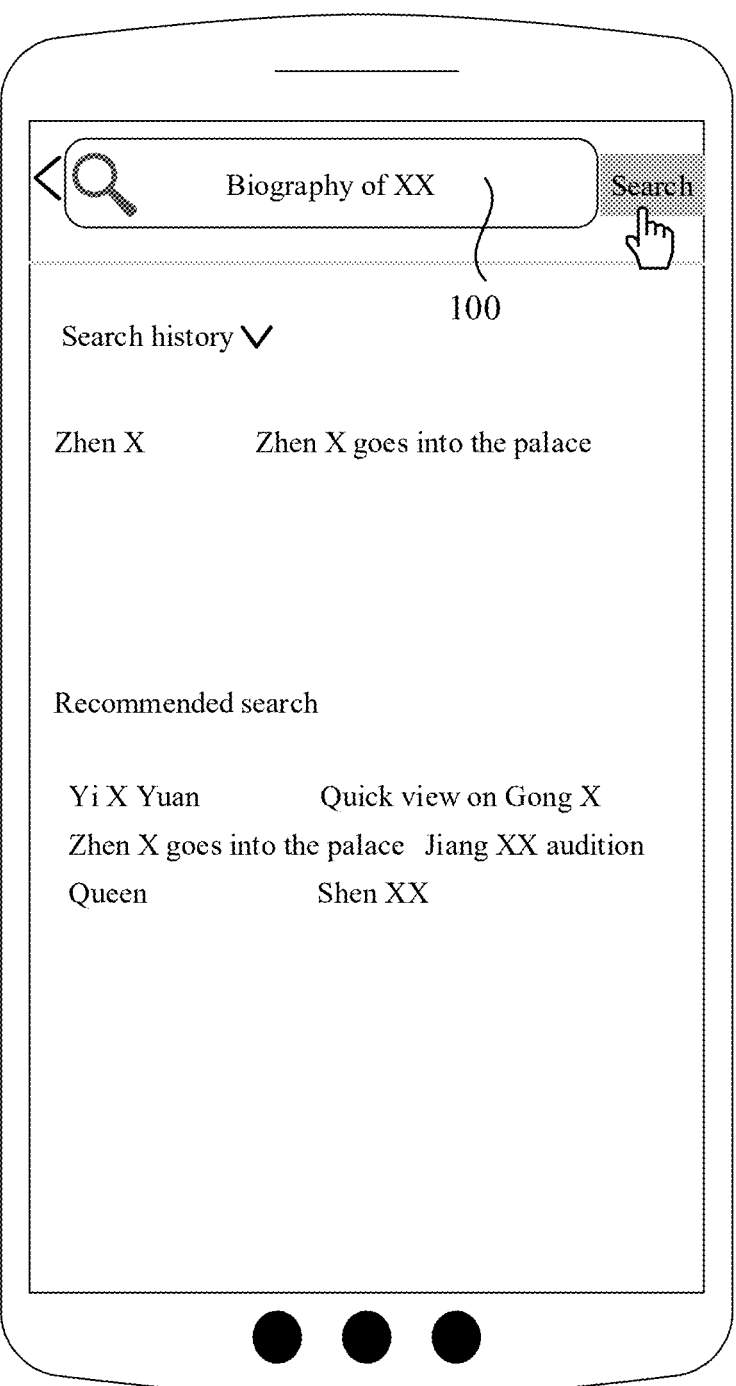
FIG. 2A to FIG. 2E are schematic structural diagrams of an interface structure of recommendation words provided by embodiments of the present disclosure.

In order to better understand the above objectives, features, and advantages of the present disclosure, the following will further describe the solutions of the present disclosure. It should be noted that the embodiments of the present disclosure and features in the embodiments may be mutually combined without conflicts.

Many specific details have been elaborated in the following description to facilitate a full understanding of the present disclosure, but the present disclosure can also be implemented in other ways different from those described here. Obviously, the embodiments in the specification are only part of the embodiments of the present disclosure, rather than all the embodiments.

When a user searches for content using a search engine, if a search result is not closely related to a search keyword and does not meet a search need of the user, the user may return to a search homepage and switch to a different search channel to obtain a search result under the different search channel. When the user returns to the search homepage and switches the search channels, the user needs to re-enter the search keyword under the corresponding search channel to realize the searching.

In the prior art, for different search channels, when a user changes search keywords in the search channels, search recommendation words on the corresponding search intermediate pages are similar, i.e., default comprehensive search recommendation words in a global state are presented. That is, search recommendation words presented to the user on the search intermediate pages cannot associate, according to a need of the user, with more related and focused recommendation word content, so that the search experience of the user is reduced.

Based on this, the embodiments of the present disclosure provide a recommendation word determination method, comprising: receiving a search word, and presenting, on a search result page, a first search result corresponding to the search word under a first attribute tag, wherein the search result page comprises a plurality of attribute tags, and an attribute of the first search result is matched with the first attribute tag; in response to a switching operation for the attribute tags, presenting, on the search result page, a second search result corresponding to the search word under a second attribute tag, wherein an attribute of the second search result is matched with the second attribute tag; and in response to a triggering operation for a search box on the search result page, presenting a recommendation word set on a search intermediate page, wherein the recommendation word set is determined based on the search word and the second attribute tag. The search experience of the user is improved.

The recommendation word determination method of the present disclosure is performed by an application client corresponding to the recommendation word determination method. The application client may be a tablet, a mobile phone, a wearable device, an in-vehicle device, an augmented reality (AR)/virtual reality (VR) device, a laptop, an ultra-mobile personal computer (UMPC), a netbook, a personal digital assistant (PDA), a smart TV, a smart screen, a high-definition TV, a 4K TV, a smart speaker, and a smart projector.

As shown in FIG. 1, the recommendation word determination method comprises the following steps.

S10. A search word is received, and a first search result corresponding to the search word under a first attribute tag is presented on a search result page.

The search result page comprises a plurality of attribute tags, and an attribute of the first search result is matched with the first attribute tag.

Specifically, the attribute tags comprise: following, general, recommendation, video, short video, novel, music, entertainment, films and television, Q&A, and the like.

When a user enters the search word in a search box, the application client presents the first search result corresponding to the search word under a recommendation tag in response to the search word entered by the user into the search box.

Figure 2B:
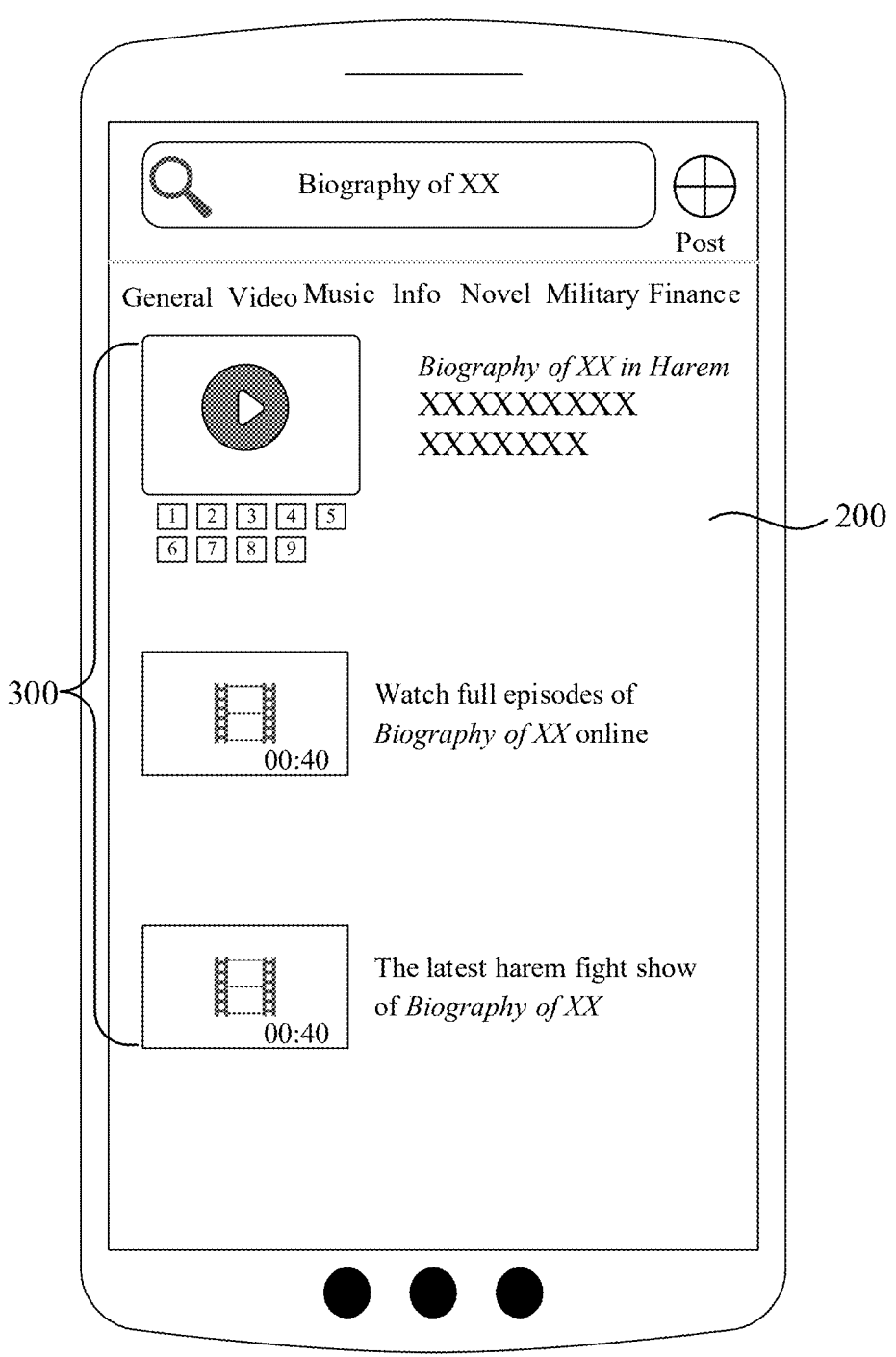

Exemplarily, as shown in FIG. 2A, if a search word entered by a user in a search box 100 is "Biography of XX", and a search button is triggered, a first search result 300 corresponding to "Biography of XX" under the general tag is presented on a search result page 200, as shown in FIG. 2B.

It should be noted that the above embodiment exemplarily represents that the first attribute tag is the general tag. In a specific implementation, after the search word is received, the first attribute tag may be customized, and the first search result corresponding to the search word under the corresponding first attribute tag is presented on the search page. The present disclosure does not make a specific limitation on this.

S20. In response to a switching operation for the attribute tags, a second search result corresponding to the search word under a second attribute tag is presented on the search result page, wherein an attribute of the second search result is matched with the second attribute tag.

Figure 2C:
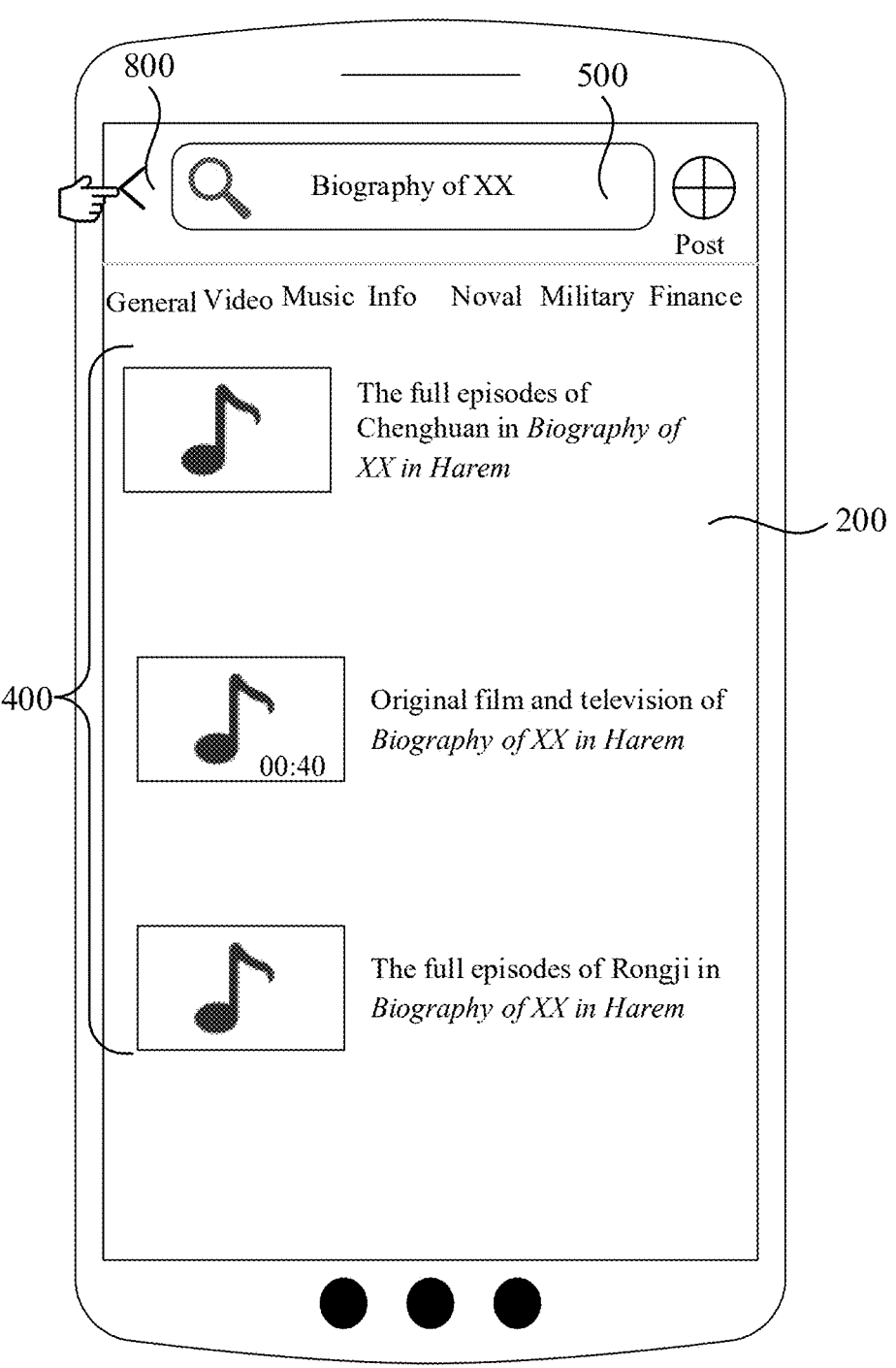

When a user triggers the switching of the attribute tags on the search result page 200, for example, when a user triggers the switching from the general attribute tag to the music attribute tag, a second search result 400 corresponding to "Biography of XX" under the music attribute tag is presented on the search result page 200 in response to the switching operation for the attribute tags. The second search result is as shown in FIG. 2C. An attribute of the second search result 400 is matched with the second attribute tag.

It should be noted that the attribute of the second search result may be a file type of the second search result, or may be a tag corresponding to the second search result. The embodiments of the present disclosure do not make a specific limitation on this.

S30. In response to a triggering operation for a search box on the search result page, a recommendation word set is presented on a search intermediate page, wherein the recommendation word set is determined based on the search word and the second attribute tag.

Figure 2D:
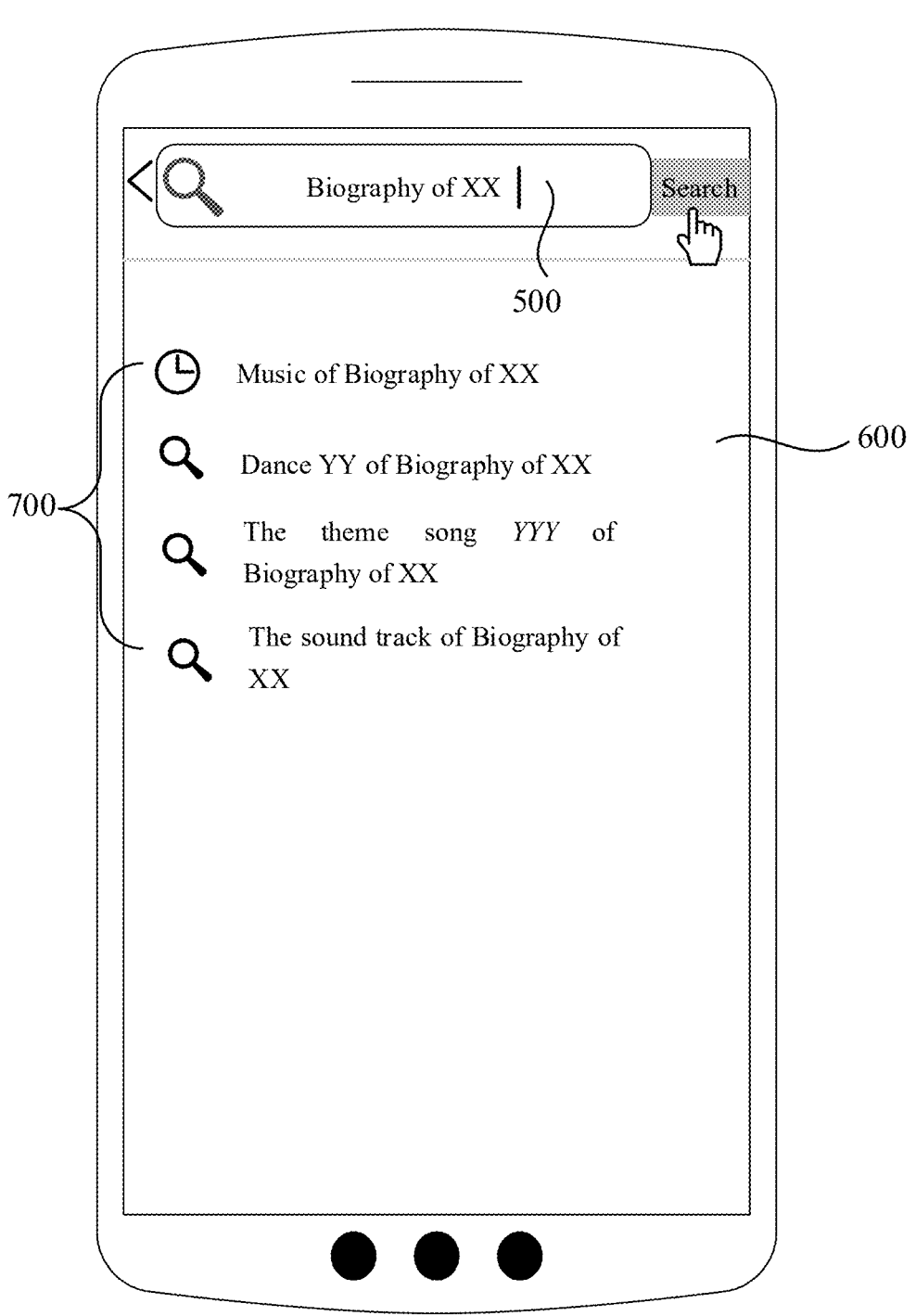

When a user triggers the search box on the search result page, with reference to FIG. 2C, when a user triggers a search box 500 in the search result page 200, the recommendation word set is presented on the search intermediate page, as shown in FIG. 2D.

In a specific implementation, the triggering operation for the search box on the search result page may be a click on the search box with a focus, or may be a deletion operation for the search box, or may be a trigger for a target control corresponding to the search box. The embodiments of the present disclosure do not make a specific limitation on the triggering operation for the search box.

According to the recommendation word determination method provided by the embodiments of the present disclosure, after receiving a search word, a client presents, on a search result page, a first search result corresponding to the search word under a first attribute tag; in response to a switching operation for the attribute tags, presents, on the search result page, a second search result corresponding to the search word under a second attribute tag, wherein an attribute of the second search result is matched with the second attribute tag; and in response to a triggering operation for a search box on the search result page, presents a recommendation word set on a search intermediate page, wherein the recommendation word set is determined based on the search word and the second attribute tag. When a user performs switching to a different attribute tag for searching, the recommendation word set presented to the user on the search result page is associated according to a search need (the search word and the attribute tags) of the user, and the accuracy of the search recommendation words presented to the user on the search intermediate page is improved.

As an implementation, a specific process of determining the recommendation word set based on the search word and the second attribute tag comprises:

determining an extension word based on the second attribute tag; and performing splicing combination based on candidate recommendation words corresponding to the search word, and the extension word, and generating target recommendation words to obtain the recommendation word set.

Exemplarily, if the entered search word is "harem fight TV series", the candidate recommendation words determined based on the search word exemplarily comprise "Biography of XX" and "Bu Bu XX"; if the second attribute tag is video, the extension word corresponding to "Biography of XX" are determined as full episodes of Chenghuan, full episodes of Rongchong, and the like. Based on the video attribute tag, the extension word corresponding to "Bu Bu XX" is determined as "Jiu Zi XX", "granting a marriage", and the like. After the candidate recommendation words corresponding to the search word and the extension word corresponding to the candidate recommendation words are determined, based on the candidate recommendation words and the extension word corresponding to the candidate recommendation words, the target recommendation word such as "full episodes of Rongchong in Biography of XX", "full episodes of Chenghuan in Biography of XX", "Jiu Zi XX in Bu Bu XX", "granting a marriage in Bu Bu XX" can be determined. The determined target recommendation words can be determined as the recommendation word set.

It should be noted that in the process of determining the candidate recommendation words based on the search word, the determined candidate recommendation words have an association relationship with the search word. If the search word is "harem fight TV series", it can be determined that the candidate recommendation words are TV series about harem fights, TV series about harems, or the like, or the candidate recommendation words are TV series focusing on harem fights, TV series focusing on harems, or the like.

In addition, in the process of determining the extension word corresponding to the candidate recommendation words based on the attribute tag, the extension word may be the same as the attribute tag, or may be a word having an association relationship with the attribute tag. For example, if the attribute tag is the video attribute tag, the extension word comprise: videos of, collection of YY clips, and the like. The process of determining the target recommendation words based on the candidate recommendation words and the corresponding extension word may be as follows: splicing the candidate recommendation words and the corresponding extension word to obtain the target recommendation word.

In the process of performing splicing combination on the candidate recommendation words and the extension word, this splicing combination process may be candidate recommendation word+the extension word, or the extension word+candidate recommendation word, or a portion of candidate recommendation word+the extension word, or a portion of candidate recommendation word+a portion of the extension word. The embodiments of the present disclosure will not make a specific limitation on the splicing combination process.

As another implementation, a specific process of determining the recommendation word set based on a first recommendation word set corresponding to the search word and a second recommendation word set corresponding to the second attribute tag comprises:

based on the second attribute tag, obtaining a first recommendation word subset from the first recommendation word set, and obtaining a second recommendation word subset from the second recommendation word set, wherein recommendation words in the first recommendation word subset and the second recommendation word subset are matched with the second attribute tag; and processing and splicing the recommendation words in the first recommendation word subset and the second recommendation word subset to obtain the recommendation word set.

Exemplarily, if the entered search word is "harem fight TV series", the first recommendation word set determined based on the search word exemplarily comprises "Biography of XX", "Bu Bu XX", "YY soundtrack", and "ZZ soundtrack". If the second attribute tag is video, the first recommendation word subset obtained from the first recommendation word set based on the video attribute tag comprises "Biography of XX" and "Bu Bu XX". If the second recommendation word set determined based on the video attribute tag, i.e., the second attribute tag, comprises "compilation of XX", "compilation of funny XX", "Biography of XX", "Bu Bu XX", and the like, the second recommendation word subset obtained from the second recommendation word set based on the search word comprises "compilation of XX", "Biography of XX", and "Bu Bu XX". After the first recommendation word subset and the second recommendation word subset are determined, the recommendation word set is determined based on the first recommendation word subset and the second recommendation word subset. If the first recommendation word subset comprises "Biography of XX" and "Bu Bu XX", and the second recommendation word subset comprises "compilation of XX", "Biography of XX", and "Bu Bu XX", the determined recommendation word set comprises "compilation of XX", "Biography of XX", and "Bu Bu XX".

It should be noted that in the above embodiment, after the first recommendation word subset and the second recommendation word subset are determined, in the process of determining the recommendation word set based on the first recommendation word subset and the second recommendation word subset, a union set of the first recommendation word subset and the second recommendation word subset is selected as the recommendation word set.

In addition, the first recommendation word set determined based on the search word comprises first recommendation words under different attribute tags, and the second recommendation word set determined based on the second attribute tag comprises second recommendation words under the second attribute tag. Therefore, in the process of obtaining the first recommendation word subset from the first recommendation word set based on the second attribute tag, the first recommendation word subset having the second attribute tag as its attribute tag is obtained from the first recommendation word set. In the process of obtaining the second recommendation word subset from the second recommendation word set based on the search word, the second recommendation word subset corresponding to the search word is obtained from the second recommendation word set, thereby ensuring that the obtained and determined recommendation word set is richer and more comprehensive.

According to the recommendation word determination method provided by the embodiments of the present disclosure, after the first recommendation word set is determined based on the search word, the first recommendation word subset is first obtained from the first recommendation word set based on the second attribute tag. After the second recommendation word set is determined based on the second attribute tag, the second recommendation word subset is then obtained from the second recommendation word set based on the search word. Finally, the recommendation word set is determined based on the first recommendation word subset and the second recommendation word subset, thereby ensuring that the determined recommendation word set is more comprehensive.

As an implementation, in response to a triggering operation for a search box on the search result page, a recommendation word set is presented on a search intermediate page, which comprises:

In response to a trigger for a focus of the search box on the search result page, the recommendation word set is presented on the search intermediate page.

Exemplarily, in combination with FIG. 2C and FIG. 2D, when a user places the focus in the search box on the search result page 200, in response to a trigger for the focus of the search box on the search result page, the recommendation word set is presented on the search intermediate page. FIG. 2D shows a search intermediate page 600. FIG. 2D shows a presentation manner of a recommendation word set 700 on the search intermediate page 600.

As another implementation, in response to a triggering operation for a search box on the search result page, a recommendation word set is presented on a search intermediate page, which comprises:

In response to a deletion of the search word from the search box on the search result page, the recommendation word set is presented on the search intermediate page.

Figure 2E:
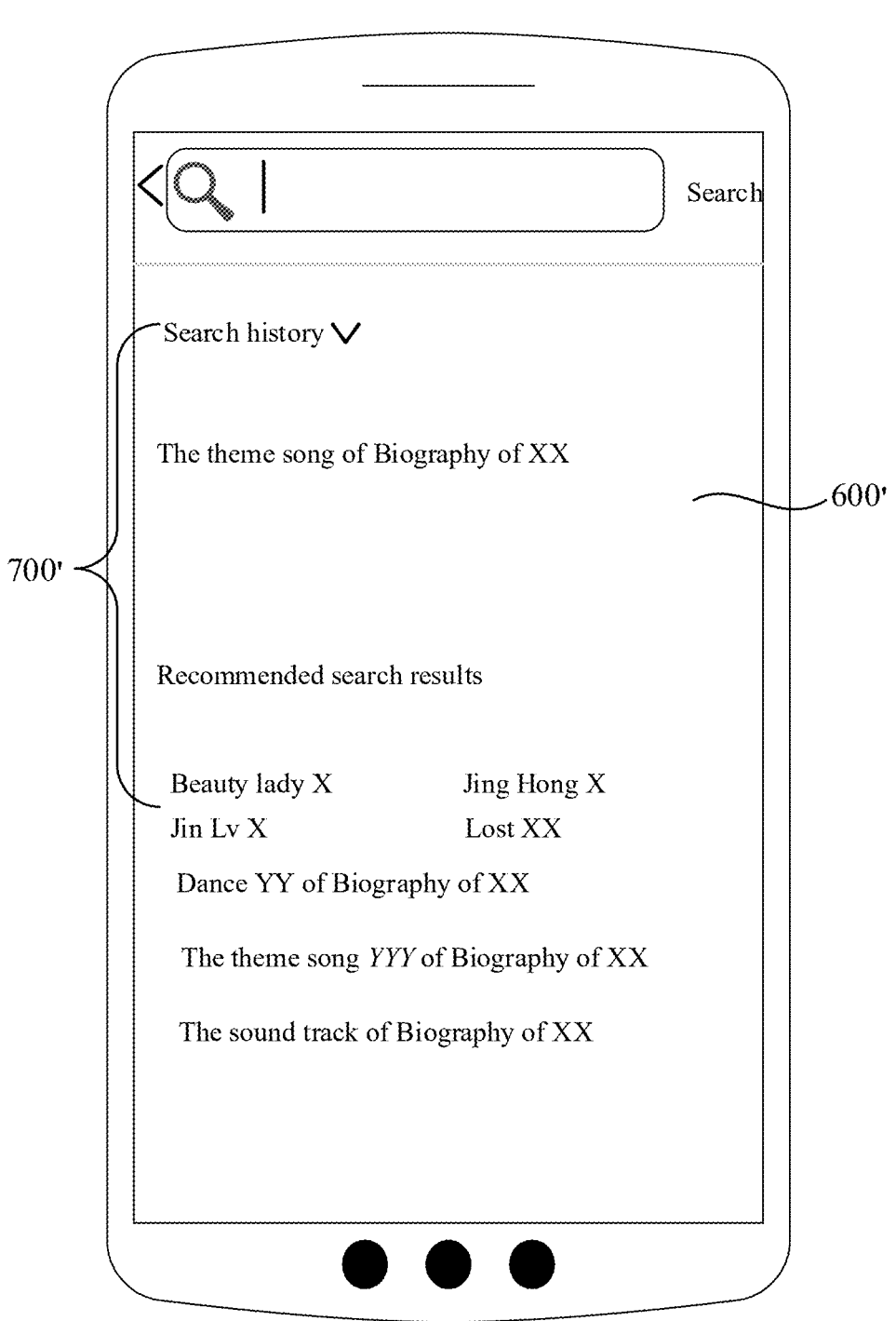

Exemplarily, in combination with FIG. 2C and FIG. 2E, when a user places the focus in the search box on the search result page 200 and deletes the search word from the search box. At this time, in response to the deletion of the search word from the search box on the search result page, the recommendation word set is presented on the search intermediate page. FIG. 2E shows a search intermediate page 600'. FIG. 2E shows a presentation manner of a recommendation word set 700' on the search intermediate page 600'.

As still another implementation, in response to a triggering operation for a search box on the search result page, a recommendation word set is presented on a search intermediate page, which comprises:

In response to a trigger for a target control corresponding to the search box on the search result page, the recommendation word set is presented on the search intermediate page.

Exemplarily, in combination with FIG. 2C and FIG. 2E, when a user triggers a target control 800 corresponding to the search box on the search result page 200, in response to the triggering operation for the target control corresponding to the search box on the search result page, the recommendation word set is presented on the search intermediate page. FIG. 2E shows a search intermediate page 600'. FIG. 2E shows a presentation manner of a recommendation word set 700' on the search intermediate page 600'.

It should be noted that the above embodiment exemplarily represents three responses to the triggering operation for the search box on the search result page. The method for presenting the recommendation word set on the search intermediate page is not specifically limited in the embodiments of the present disclosure.

In an optional implementation, the recommendation word determination method further comprises:

In response to a triggering operation for any target recommendation word in the recommendation word set, a target search result matched with the target recommendation word and the second attribute tag is presented on the search result page. Or, in response to a triggering operation for any target recommendation word in the recommendation word set, a target search result matched with the target recommendation word is presented on the search result page, wherein the target search result comprises third search results corresponding to the target search word under different attribute tags, and a presentation priority of a search result, having an attribute tag matched with the second attribute tag, among the third search results is higher than a presentation priority of a search result, having an attribute tag not matched with the second attribute tag, among the third search results.

As an implementation, when the search box is triggered on the search result page under the video tag, the page jumps to the search intermediate page. A user selects any target recommendation word from the recommendation word set presented on the search intermediate page. At this time, the search intermediate page jumps to the search result page, and the target search result is presented on the search result page. The target search result is matched with the target recommendation word selected by the user from the recommendation word set and the second attribute tag. Exemplarily, the recommendation word set presented on the search intermediate page comprises "compilation of XX", "Biography of XX", and "Bu Bu XX". The user selects "Bu Bu XX" and clicks on the target recommendation word. At this time, the search intermediate page jumps to the search result page, and the target search result is presented on the search result page. The target search result is matched with the target recommendation word "Bu Bu XX" and the video tag. Namely, a video search result corresponding to the target recommendation word "Bu Bu XX" is presented on the search result page.

As another implementation, when the search box is triggered in the search result page under a video tag, the page jumps to the search intermediate page. A user selects any target recommendation word from the recommendation word set presented on the search intermediate page. At this time, the search intermediate page jumps to the search result page, and the target search result is presented on the search result page. The target search result is matched with the target recommendation word selected by the user from the recommendation word set and the second attribute tag. The target search result comprises third search results corresponding to the target search word under different attribute tags, and a presentation priority of a search result, having an attribute tag matched with the second attribute tag, among the third search results is higher than a presentation priority of a search result, having an attribute tag not matched with the second attribute tag, among the third search results. Exemplarily, the recommendation word set presented on the search intermediate page comprises "compilation of XX", "Biography of XX", and "Bu Bu XX". A user selects "Bu Bu XX" and clicks on the target recommendation word. At this time, the search intermediate page jumps to the search result page, and the target search result is presented on the search result page. The target search result is matched with the target recommendation word "Bu Bu XX" tag. Namely, the search results corresponding to the target recommendation word "Bu Bu XX" are presented on the search result page. Since the presented search results comprise search results under different attribute tags, it can be ensured, by setting that the priority of presentation of the search result matched with the second attribute tag is higher than the search result, having the attribute tag not matched with the second attribute tag, among the third search results, that the search result matched with the second attribute tag is preferentially presented, and thus the user can preferentially view the search result matched with the second attribute tag, thereby meeting the search need of the user.

It should be noted that in the above embodiment, when a user performs the triggering operation on the search box of the search result page, the application client sends the recommendation word set obtaining request to a server. After receiving the recommendation word set obtaining request sent by the application client, the server obtains the recommendation word set corresponding to the recommendation word set obtaining request based on the second attribute tag and the search word in the recommendation word set obtaining request and the server sends the obtained recommendation word set to the application client. The application client presents the recommendation word set sent by the server on the search intermediate page.

The recommendation word determination method provided by the above embodiments is performed by the application client. Specific implementation steps of a recommendation word determination method performed by a server will be explained below through specific embodiments. As shown in FIG. 3, the recommendation word determination method comprises the following steps.

S100. A recommendation word set obtaining request sent by a client is received.

The recommendation word set obtaining request comprises a second attribute tag and a search word, and the recommendation word set obtaining request is used for requesting to obtain a recommendation word set.

After a user enters the search word into a search box and performs the switching to the second attribute tag, a search operation is triggered. The server receives the recommendation word set obtaining request sent by the client, and obtains a recommendation word set corresponding to the second attribute tag and recommendation words based on the second attribute tag and the search word in the recommendation word set obtaining request.

Specifically, the attribute tag in the recommendation word set obtaining request comprises: following, general, recommendation, video, short video, novel, music, entertainment, films and television, Q&A, and the like.

S200. A recommendation word set is obtained based on the second attribute tag and the search word.

A recommendation word in the recommendation word set is matched with the second attribute tag.

Specifically, when a user performs a triggering operation on a search box of a search result page, the application client sends the recommendation word set obtaining request to the server. The server, after receiving the recommendation word set obtaining request sent by the application client, obtains the recommendation word set corresponding to the recommendation word set obtaining request based on the second attribute tag and the search word in the recommendation word set obtaining request, and sends the obtained recommendation word set to the application client. The application client presents the recommendation word set sent by the server on a search intermediate page.

According to the recommendation word determination method provided by the embodiments of the present disclosure, after the recommendation word obtaining request sent by the client is received, the recommendation word set is obtained based on the second attribute tag and the search word in the recommendation word obtaining request. As such, when a user performs the switching to a different attribute tag for searching, the recommendation word set presented on the search result page to the user is associated according to a search need of the user, and the recommendation word set is more related to the search word of the user and the attribute tag that is switched to.

As an implementation, a recommendation word set is obtained based on the attribute tag and the search word, which comprises:

An extended word is determined based on the second attribute tag; and a splicing combination is performed based on candidate recommendation words corresponding to the search word, and the extension word, and target recommendation words are generated to obtain the recommendation word set.

In specific implementation, after the server receives the recommendation word set obtaining request sent by the client, the server first determines the candidate recommendation words based on the search word comprised in the recommendation word set obtaining request, and then determines the extension word corresponding to the candidate recommendation word set based on the second attribute tag comprised in the recommendation word set obtaining request, thereby determining the target recommendation words based on the candidate recommendation words and the corresponding extension word and finally determining the recommendation word set based on the target recommendation words.

Exemplarily, if the entered search word is "harem fight TV series", the candidate recommendation words determined based on the search word exemplarily comprise "Biography of XX" and "Bu Bu XX". If the second attribute tag is video, the extension word corresponding to "Biography of XX" is determined as full episodes of Chenghuan, full episodes of Rongchong, and the like based on the video attribute tag. The extension word corresponding to "Bu Bu XX" is determined as Jiu Zi YY, granting a marriage, and the like based on the video attribute tag. After the candidate recommendation words corresponding to the search word and the extension word corresponding to the candidate recommendation words are determined, it is determined, based on the candidate recommendation words and the extension word corresponding to the candidate recommendation words that target recommendation words comprise "full episodes of Rongchong in Biography of XX", "full episodes of Chenghuan in Biography of XX", "Jiu Zi YY in Bu Bu XX", "granting a marriage in Bu Bu XX". The determined target recommendation words are determined as the recommendation word set.

As another implementation, a recommendation word set is obtained based on the second attribute tag and the search word, which comprises:

Based on the second attribute tag, a first recommendation word subset is obtained from the first recommendation word set, and a second recommendation word subset is obtained from the second recommendation word set, wherein recommendation words in the first recommendation word subset and the second recommendation word subset are matched with the second attribute tag. The recommendation words in the first recommendation word subset and the second recommendation word subset are processed and spliced to obtain the recommendation word set.

Exemplarily, if the entered search word is "harem fight TV series", the first recommendation word set determined based on the search word exemplarily comprises "Biography of XX", "Bu Bu XX", "YY soundtrack", and "ZZ soundtrack". If the second attribute tag is video, the first recommendation word subset obtained from the first recommendation word set based on the video attribute tag comprises "Biography of XX" and "Bu Bu XX". If the second recommendation word set determined based on the video attribute tag, i.e., the second attribute tag, comprises "compilation of XX", "compilation of funny XX", "Biography of XX", "Bu Bu XX", and the like, the second recommendation word subset obtained from the second recommendation word set based on the search word comprises "compilation of XX", "Biography of XX", and "Bu Bu XX". After the first recommendation word subset and the second recommendation word subset are determined, the recommendation word set is determined based on the first recommendation word subset and the second recommendation word subset. If the first recommendation word subset comprises "Biography of XX" and "Bu Bu XX", and the second recommendation word subset comprises "compilation of XX", "Biography of XX", and "Bu Bu XX", the determined recommendation word set comprises "compilation of XX", "Biography of XX", and "Bu Bu XX".

As still another implementation, a recommendation word set is obtained based on the second attribute tag and the search word, which comprises:

Obtaining the recommendation word set corresponding to the second attribute tag and the search word from a database based on the second attribute tag and the search word.

Specifically, when the server receives the recommendation word set obtaining request sent by the client, the server obtains the recommendation word set corresponding to the second attribute tag and the search word from the database based on the second attribute tag and the search word in the recommendation word set obtaining request sent by the client.

In a specific implementation, before the recommendation word set corresponding to the second attribute tag and the search word is obtained from a database based on the second attribute tag and the search word, an implementation of determining the recommendation word set in the database comprises:

Obtaining historical search words comprising the search word; and filtering the historical search words are filtered to obtain the recommendation word set matched with the second attribute tag.

Specifically, search results obtained based on the search word are first obtained based on the search word. The historical search words comprising the search word are then selected from the search results obtained based on the search word. Finally, the historical search words are filtered based on the second attribute tag to obtain the recommendation word set matched with the second attribute tag, and the recommendation word set is stored into the database.

Exemplarily, when the search word entered by a user is "Da X Wei", the search results obtained based on the search word "Da X Wei" comprise: 1. Da X Wei adapts "We all have XX"; 2. "Let me fall in love XX" sung by Da X Wei in Day Day XX is on fire; 3. Which episode in Our X Da X Wei adapts songs; 4. Da X Wei uses a promotion token in X IN CHINA; 5. Funny Da X Wei in LIVE XX. At this time, the historical search words comprising the search word "Da Zhang Wei" are "Adapted by Da Zhang Wei", "Da X Wei in Day Day XX", "Da X Wei in X IN CHINA", and "Da X Wei in LIVE XX", and they are selected from the search results. If the second attribute tag is variety show, the recommendation word set that is selected from the historical search words based on the second attribute tag and is matched with the second attribute tag comprises: "Da X Wei in Day Day XX", "Da X Wei in X IN CHINA", and "Da X Wei in LIVE XX".

In a specific implementation, before the recommendation word set corresponding to the second attribute tag and the search word is obtained from a database based on the second attribute tag and the search word, another implementation of determining the recommendation word set in the database comprises:

Obtaining a historical search result of the search word; obtaining candidate recommendation words corresponding to the historical search result; and obtaining the recommendation word set matched with the second attribute tag from the candidate recommendation words.

Specifically, the historical search result obtained based on the search word is first obtained based on the search word; the corresponding candidate recommendation words are determined based on the historical search result obtained based on the search word; and finally, the recommendation word set matched with the second attribute tag is obtained from the candidate recommendation words based on the second attribute tag and is stored into the database.

Exemplarily, when the search word entered by a user is "Da X Wei", the historical search results obtained based on the search word "Da X Wei" comprise: 1. Da X Wei adapts "We all have XX"; 2. "Let me fall in love XX" sung by Da X Wei in Day Day XX is on fire; 3. Which episode in Our X Da X Wei adapts songs; 4. Da X Wei uses a promotion token in X IN CHINA; 5. Funny Da X Wei in LIVE XX. At this time, in the process of obtaining the candidate recommendation words corresponding to the historical search results based on the historical search results, since the historical search result "Da X Wei adapts "We all have XX"" comprises a song name "We all have XX"; the search result ""Let me fall in love XX" sung by Da X Wei in Day Day XX is on fire" comprises a variety show name and a song name, where the variety show name is Day Day XX, and the song name is "Let me fall in love XX"; a variety show name of the search result, Which episode in Our X Da X Wei adapts songs, is Our X; the search result "Da X Wei uses a promotion token in X IN CHINA" comprises a variety show name of X IN CHINA; the search result "Funny Da X Wei in LIVE XX" comprises a variety show name of LIVE XX, the candidate recommendation words obtained based on the historical search results corresponding to the search word "Da X Wei" entered by the user can thus comprise: We all have XX, Day Day XX, Let me fall in love XX, Our X, X IN CHINA, and LIVE XX.

If the second attribute tag is variety show, the recommendation word set that is selected from the historical search words based on the second attribute tag and is matched with the second attribute tag comprises: "Day Day XX", "X IN CHINA", "LIVE XX", and "Our X".

As an implementation, the specific process of obtaining the recommendation word set matched with the second attribute tag from the candidate recommendation words based on the second attribute tag comprises:

obtaining the recommendation word set matched with the second attribute tag from the candidate recommendation words based on the second attribute tag and interaction data for the candidate recommendation words.

Specifically, a candidate recommendation word set matched with the second attribute tag is obtained from the candidate recommendation words.

Recommendation parameters for the candidate recommendation words in the candidate recommendation word set are determined based on the interaction data for the candidate recommendation words.

The interaction data comprises a search frequency, a search time period, and/or a browse behavior.

Specifically, the search frequency means a number of searches based on a candidate recommendation word in historical search data; the search time period means a search time, corresponding to search based on a candidate recommendation word, in the historical search data; and the browse behavior means a frequency at which a user browses different historical search results based on the historical search results.

In the historical search data, if the number of searches based on a candidate recommendation word is larger, a recommendation parameter proportion of the candidate recommendation word in the candidate recommendation word set will be larger.

In the historical search data, if the number of searches based on a candidate recommendation word within a time period is larger, a recommendation parameter proportion of the candidate recommendation word will be larger in the candidate recommendation word set.

In the historical search data, if, among the historical search results obtained based on a candidate recommendation word, a user browses a historical search result more frequently or spends longer time in browsing a historical search result, a recommendation parameter proportion of the candidate recommendation word comprised in the frequently browsed historical search result or the historical search result that the user spends longer time in browsing will be larger in the candidate recommendation word set.

The candidate recommendation words are obtained from the candidate recommendation word set based on the recommendation parameters for the candidate recommendation words in the candidate recommendation word set and form the recommendation word set.

After the candidate recommendation word set matched with the second attribute tag is obtained from the candidate recommendation words based on the second attribute tag, the recommendation parameters for the candidate recommendation words in the candidate recommendation word set are determined based on the interaction data for the candidate recommendation words; and the recommendation word set is obtained from the candidate recommendation word set based on the recommendation parameters for the candidate recommendation words in the candidate recommendation word set.

Exemplarily, if the second attribute tag is variety show, the candidate recommendation word set selected from the historical search words based on the second attribute tag and matched with the second attribute tag comprises: "Day Day XX", "X IN CHINA", "LIVE XX", and "Our X". If a user triggers candidate recommendation word "X IN CHINA" once, triggers candidate recommendation word "Day Day XX" for three times, triggers candidate recommendation word "LIVE XX" for three times, and triggers candidate recommendation word "Our X" for three times, it can be determined that the recommendation parameter of candidate recommendation word "X IN CHINA" is A1, the recommendation parameter of candidate recommendation word "Day Day XX" is A2, the recommendation parameter of candidate recommendation word "LIVE XX" is A3, the recommendation parameter of candidate recommendation word "Our X" is A4, and A4=A3=A2>A1.

When the recommendation word set presented on the search intermediate page comprises three candidate recommendation words, top three candidate recommendation words with large recommendation parameters are selected according to the recommendation parameters for the candidate recommendation words in the candidate recommendation word set, namely, the recommendation word set comprises: "Our X", "LIVE XX", and "Day Day XX".

It should be noted that in the above embodiment, the recommendation parameters for the candidate recommendation words are determined exemplarily based on the search frequencies of candidate recommendation words. In other implementations, the recommendation parameters for the candidate recommendation words may alternatively be determined based on the search time periods and/or browse behaviors of the candidate recommendation words.

For example, when the second attribute tag is food, the search word entered by a user in the food attribute tag is "cookbook", and the search results based on the search word "cookbook" in the food attribute tag comprise: 1. Cooked in three minutes and more delicious than deep-fried dough sticks; 2. What do elementary school students have for breakfast? Simple breakfast for seven days; 3. Making millet porridge without directly using water; 4. Chinese steamed eggs, fresh and tender; 5. There are 10 methods for making fried vegetables. The obtained candidate recommended words comprise: deep-fried dough sticks, breakfast, millet porridge, Chinese steamed eggs, and fried vegetables.

However, the search time when the user triggers candidate recommendation word "millet porridge" is in the morning; the search time when the user triggers candidate recommendation word "deep-fried dough sticks" is in the morning; the search time when the user triggers candidate recommendation word "Chinese steamed egg" is at noon; and the search time when the user triggers candidate recommendation word "fried vegetables" is at noon. It can be determined that the recommendation parameters for candidate recommendation words "millet porridge" and "deep-fried dough sticks" in the morning are greater than the recommendation parameters for candidate recommendation words "Chinese steamed egg" and "fried vegetables" in the morning, and the recommendation parameters for candidate recommendation words "millet porridge" and "deep-fried dough sticks" at noon are less than the recommendation parameters for candidate recommendation words "Chinese steamed egg" and "fried vegetables" at noon.

If the user enters the search word under the second attribute tag in the morning, the recommendation word set obtained from the candidate recommendation word set according to the recommendation parameters for the candidate recommendation words comprise millet porridge and deep-fried dough sticks.

In other implementations, the recommendation parameters for the candidate recommendation words may be determined based on both the search frequency and the search time period. Exemplarily, the proportion of the search frequency is 70%, and the proportion of the search time is 30%. When the recommendation parameter for a candidate recommendation word under the search frequency is determined as B1, and the recommendation parameter for the candidate recommendation word under the search time is determined as C1, the recommendation parameter for the candidate recommendation word is determined as 0.7B1+ 0.3C1. By obtaining the recommendation parameters corresponding to the various candidate recommendation words in sequence, a preset number of candidate recommendation words with the highest recommendation parameters are selected as the recommendation word set.

FIG. 4 is a schematic structural diagram of a recommendation word determination apparatus provided by embodiments of the present disclosure. As shown in FIG. 4, the recommendation word determination apparatus comprises:

a first search result presenting module 410, configured to: receive a search word, and present, on a search result page, a first search result corresponding to the search word under a first attribute tag, wherein the search result page comprises a plurality of attribute tags, and an attribute of the first search result is matched with the first attribute tag;

a second search result presenting module 420, configured to: in response to a switching operation for the attribute tags, present, on the search result page, a second search result corresponding to the search word under a second attribute tag, wherein an attribute of the second search result is matched with the second attribute tag; and a recommendation word set presenting module 430, configured to: in response to a triggering operation for a search box on the search result page, present a recommendation word set on a search intermediate page, wherein the recommendation word set is determined based on the search word and the second attribute tag.

According to the recommendation word determination apparatus provided by the embodiments of the present disclosure, after receiving a search word, the first search result presenting module presents, on a search result page, a first search result corresponding to the search word under a first attribute tag, wherein the search result page comprises a plurality of attribute tags, and an attribute of the first search result is matched with the first attribute tag; in response to a switching operation for the attribute tags, the second search result presenting module presents, on the search result page, a second search result corresponding to the search word under a second attribute tag, wherein an attribute of the second search result is matched with the second attribute tag; and in response to a triggering operation for a search box on the search result page, the recommendation word set presenting module presents a recommendation word set on a search intermediate page, wherein the recommendation word set is determined based on the search word and the second attribute tag. When a user performs switching to a different attribute tag for searching, the recommendation word set presented on a search result page to the user is associated according to a search need of the user, and the recommendation word set is more related to a search word of the user and switched attribute tags.

Optionally, the recommendation word determination apparatus is further configured to implement:

determining an extension word based on the second attribute tag; and performing splicing combination based on candidate recommendation words corresponding to the search word, and the extension word, and generating target recommendation words to obtain the recommendation word set.

Optionally, the recommendation word determination apparatus is further configured to implement:

based on the second attribute tag, obtaining a first recommendation word subset from the first recommendation word set, and obtaining a second recommendation word subset from the second recommendation word set, wherein recommendation words in the first recommendation word subset and the second recommendation word subset are matched with the second attribute tag; and processing and splicing the recommendation words in the first recommendation word subset and the second recommendation word subset to obtain the recommendation word set.

Optionally, a specific implementation of the recommendation word set presenting module comprises:

in response to a trigger for a focus of the search box on the search result page, presenting the recommendation word set on the search intermediate page; or in response to a deletion of the search word from the search box on the search result page, presenting the recommendation word set on the search intermediate page; or in response to a trigger for a target control corresponding to the search box on the search result page, presenting the recommendation word set on the search intermediate page. Optionally, the apparatus further comprises:

a target search result, configured to: in response to a triggering operation for any target recommendation word in the recommendation word set, present, on the search result page, a target search result matched with the target recommendation word and the second attribute tag; or, in response to a triggering operation for any target recommendation word in the recommendation word set, present, on the search result page, a target search result matched with the target recommendation word, wherein the target search result comprises third search results corresponding to the target search word under different attribute tags, and a presentation priority of a search result, having an attribute tag matched with the second attribute tag, among the third search results is higher than a presentation priority of a search result, having an attribute tag not matched with the second attribute tag, among the third search results.

FIG. 5 is a schematic structural diagram of another recommendation word determination apparatus provided by embodiments of the present disclosure. As shown in FIG. 5, the recommendation word determination apparatus comprises:

a request receiving module 510, configured to receive a recommendation word set obtaining request sent by a client, wherein the recommendation word set obtaining request comprises a second attribute tag and a search word, and the recommendation word set obtaining request is used for requesting to obtain a recommendation word set; and a recommendation word set obtaining module 520, configured to obtain a recommendation word set based on the second attribute tag and the search word, wherein a recommendation word in the recommendation word set is matched with the second attribute tag.

According to the recommendation word determination apparatus provided by the embodiments of the present disclosure, after the request receiving module receives the recommendation word obtaining request sent by the client, the recommendation word set obtaining module obtains the recommendation word set based on the second attribute tag and the search word in the recommendation word obtaining request, so that when a user performs switching to different attribute tags or searching, the recommendation word set presented on the search result page to the user are associated according to a search need of the user, and the recommendation word set is more related to a search word of the user and the switched attribute tags.

Optionally, another implementation of the recommendation word set obtaining module comprises:

obtaining the recommendation word set corresponding to the second attribute tag and the search word from a database based on the second attribute tag and the search word.

Optionally, the apparatus further comprises:

a historical search word obtaining module, configured to obtain historical search words comprising the search word; and a recommendation word set filtering module, configured to filter the historical search words to obtain the recommendation word set matched with the second attribute tag.

Optionally, the apparatus further comprises:

a historical search result obtaining module, configured to obtain a historical search result of the search word;

a candidate recommendation word obtaining module, configured to obtain candidate recommendation words corresponding to the historical search result; and a recommendation word set matching module, configured to obtain the recommendation word set matched with the second attribute tag from the candidate recommendation words.

Optionally, an implementation of the recommendation word set matching module comprises:

obtaining the recommendation word set matched with the second attribute tag from the candidate recommendation words based on the second attribute tag and interaction data for the candidate recommendation words.

Optionally, the recommendation word set matching module comprises:

a candidate recommendation word set obtaining unit, configured to obtain a candidate recommendation word set matched with the second attribute tag from the candidate recommendation words;

a recommendation parameter determination unit, configured to determine recommendation parameters for the candidate recommendation words in the candidate recommendation word set based on the interaction data for the candidate recommendation words; and a recommendation word set obtaining unit, configured to obtain the recommendation word set from the candidate recommendation word set based on the recommendation parameters for the candidate recommendation words in the candidate recommendation word set.

Optionally, the interaction data comprises a search frequency, a search time period, and/or a browse behavior.

It is worth noting that the various units and modules comprised in the embodiments of the above apparatus are only divided according to a functional logic, but are not limited to the above division, as long as the corresponding functions can be achieved. In addition, the specific names of the various functional units are only for the purpose of distinguishing and are not used to limit the protection scope of the present invention.

The apparatus provided by the embodiments of the present invention can implement the method provided by any embodiment of the present invention, and has corresponding functional modules for implementing the method and corresponding beneficial effects.

FIG. 6 is a schematic structural diagram of an electronic device provided by embodiments of the present disclosure. As shown in FIG. 6, the electronic device comprises a processor 610, a memory 620, and an input apparatus 630, and an output apparatus 640. The quantity of the processor 610 in the electronic device 610 may be one or more, and by way of example, one processor 610 is shown in FIG. 6. The processor 610, the memory 620, the input apparatus 630, and the output apparatus 640 in the electronic device may be connected by a bus or other means. By way of example, they are connected by a bus in FIG. 6.

The memory 620, as a computer-readable storage medium, can be configured to store software programs, computer-executable programs, and modules, such as program instructions/modules corresponding to the method in the embodiments of the present application. The processor 610 runs the software programs, instructions, and modules stored in the memory 620, so as to implement various functional applications and data processing of the electronic device, namely, to implement the method provided by the embodiments of the present invention.

The memory 620 may mainly comprise a program storage region and a data storage region. The program storage region may store an operating system and an application program required by at least one function. The data storage region may store data created according to use of the terminal. In addition, the memory 620 may comprise a high speed random access memory, and may further comprise a non-volatile memory, such as at least one magnetic disk storage device, a flash memory, or another non-volatile solid storage device. In some instances, the memory 620 may further comprise a memory remotely located with respect to the processor 610. These remote memories can be connected to the computer device through a network. Examples of the above network comprise, but are not limited to, Internets, intranets, local area networks, mobile communication networks, and combinations thereof.

The input apparatus 630 may be configured to receive input numeric or character information and generate key signal inputs related to user settings and function control of the electronic device and may comprise a keyboard, a mouse, and the like. The output apparatus 640 may comprise a display device such as a display screen.

The embodiments of the present disclosure further provide a storage medium comprising computer-executable instructions. The computer-executable instructions, when executed by a computer processor, are used for implementing the method provided by the embodiments of the present invention.

Of course, the embodiments of the present invention provide a storage medium containing computer-executable instructions. The computer-executable instructions are not limited to performing the above method operations, but also can perform related operations in the method according to any embodiment of the present invention.

The present disclosure further provides a computer program product. The computer program product, when run on a computer, causes the computer to perform the method of an application program of the foregoing embodiment.

It should be noted that in this document, relationship terms such as "first" and "second" are used solely to distinguish one entity or operation from another entity or operation without necessarily requiring or implying any actual such relationship or order between such entities or operations. Furthermore, the terms "comprise", "comprising", or any other variation thereof, are intended to encompass a non-exclusive inclusion, such that a process, method, article, or device that comprises a list of elements does not comprise only those elements but may comprise other elements not explicitly listed or inherent to such process, method, article, or device. Without further limitation, an element defined by the phrase "comprising a/an . . . " does not exclude the presence of another identical elements in the process, method, article or device that comprises the element.

The above only describes the specific implementations of the present disclosure, which enables those skilled in the art to understand or implement the present disclosure. The various modifications to these embodiments will be apparent to those skilled in the art, and the general principles defined herein can be implemented in other embodiments without departing from the spirit or scope of the present disclosure. Thus, the present disclosure is not limited to these embodiments shown herein, but accords with the broadest scope consistent with the principles and novel features disclosed herein.

I claim:

1. A recommendation word determination method, wherein the method comprises:

receiving a search word, and presenting, on a search result page, a first search result corresponding to the search word under a first attribute tag, wherein the search result page comprises a plurality of attribute tags, and an attribute of the first search result is matched with the first attribute tag;

in response to a switching operation for the attribute tags, presenting, on the search result page, a second search result corresponding to the search word under a second attribute tag, wherein an attribute of the second search result is matched with the second attribute tag; and in response to a triggering operation for a search box on the search result page, presenting a recommendation word set on a search intermediate page, wherein the recommendation word set is determined based on the search word and the second attribute tag;

wherein the recommendation word set is determined based on a first recommendation word set corresponding to the search word and a second recommendation word set corresponding to the second attribute tag, which comprises:

obtaining, based on the second attribute tag, a first recommendation word subset from the first recommendation word set, and a second recommendation word subset from the second recommendation word set, wherein recommendation words in the first recommendation word subset and the second recommendation word subset are matched with the second attribute tag; and processing and splicing the recommendation words in the first recommendation word subset and the second recommendation word subset to obtain the recommendation word set.

2. The method according to claim 1, wherein the recommendation word set is determined based on the search word and the second attribute tag, which comprises:

determining an extension word based on the second attribute tag; and performing splicing combination on candidate recommendation words corresponding to the search word, and the extension word, and generating target recommendation words to obtain the recommendation word set.

3. The method according to claim 2, further comprising:

in response to a triggering operation for any target recommendation word in the recommendation word set, presenting, on the search result page, a target search result matched with the target recommendation word and the second attribute tag; or in response to a triggering operation for any target recommendation word in the recommendation word set, presenting, on the search result page, a target search result matched with the target recommendation word, wherein the target search result comprises third search results corresponding to the target search word under different attribute tags, and a presentation priority of a search result, having an attribute tag matched with the second attribute tag, among the third search results is higher than a presentation priority of a search result, having an attribute tag not matched with the second attribute tag, among the third search results.

4. The method according to claim 1, wherein in response to the triggering operation for the search box on the search result page, presenting the recommendation word set on the search intermediate page comprises:

in response to a trigger for a focus of the search box on the search result page, presenting the recommendation word set on the search intermediate page; or in response to a deletion of the search word from the search box on the search result page, presenting the recommendation word set on the search intermediate page; or in response to a trigger for a target control corresponding to the search box on the search result page, presenting the recommendation word set on the search intermediate page.

5. The method according to claim 4, further comprising:

in response to a triggering operation for any target recommendation word in the recommendation word set, presenting, on the search result page, a target search result matched with the target recommendation word and the second attribute tag; or in response to a triggering operation for any target recommendation word in the recommendation word set, presenting, on the search result page, a target search result matched with the target recommendation word, wherein the target search result comprises third search results corresponding to the target search word under different attribute tags, and a presentation priority of a search result, having an attribute tag matched with the second attribute tag, among the third search results is higher than a presentation priority of a search result, having an attribute tag not matched with the second attribute tag, among the third search results.

6. The method according to claim 1, further comprising:

in response to a triggering operation for any target recommendation word in the recommendation word set, presenting, on the search result page, a target search result matched with the target recommendation word and the second attribute tag; or in response to a triggering operation for any target recommendation word in the recommendation word set, presenting, on the search result page, a target search result matched with the target recommendation word, wherein the target search result comprises third search results corresponding to the target search word under different attribute tags, and a presentation priority of a search result, having an attribute tag matched with the second attribute tag, among the third search results is higher than a presentation priority of a search result, having an attribute tag not matched with the second attribute tag, among the third search results.

7. The method according to claim 1, further comprising:

in response to a triggering operation for any target recommendation word in the recommendation word set, presenting, on the search result page, a target search result matched with the target recommendation word and the second attribute tag; or in response to a triggering operation for any target recommendation word in the recommendation word set, presenting, on the search result page, a target search result matched with the target recommendation word, wherein the target search result comprises third search results corresponding to the target search word under different attribute tags, and a presentation priority of a search result, having an attribute tag matched with the second attribute tag, among the third search results is higher than a presentation priority of a search result, having an attribute tag not matched with the second attribute tag, among the third search results.

8. A recommendation word determination method, comprising:

receiving a recommendation word set obtaining request sent by a client, wherein the recommendation word set obtaining request comprises a second attribute tag and a search word, and the recommendation word set obtaining request is used for requesting to obtain a recommendation word set; and obtaining a recommendation word set based on the second attribute tag and the search word, wherein a recommendation word in the recommendation word set is matched with the second attribute tag;

wherein obtaining a recommendation word set based on the second attribute tag and the search word comprises:

obtaining, based on the second attribute tag, a first recommendation word subset from the first recommendation word set, and a second recommendation word subset from the second recommendation word set, wherein recommendation words in the first recommendation word subset and the second recommendation word subset are matched with the second attribute tag; and processing and splicing the recommendation words in the first recommendation word subset and the second recommendation word subset to obtain the recommendation word set;

wherein receiving a recommendation word set obtaining request sent by a client comprises:

in response to a search operation triggered by a user operation on the client, receiving the recommendation word set obtaining request, the user operation comprising entering the search word into a search box and switching to the second attribute tag.

9. The method according to claim 8, wherein obtaining the recommendation word set based on the second attribute tag and the search word comprises:

obtaining the recommendation word set corresponding to the second attribute tag and the search word from a database based on the second attribute tag and the search word.

10. The method according to claim 9, wherein the method further comprises, before obtaining the recommendation word set corresponding to the second attribute tag and the search word from the database based on the second attribute tag and the search word:

obtaining historical recommendation words comprising the search word; and filtering the historical search words to obtain the recommendation word set matched with the second attribute tag.

11. The method according to claim 9, wherein the method further comprises, before obtaining the recommendation word set corresponding to the second attribute tag and the search word from the database based on the second attribute tag and the search word:

obtaining a historical search result of the search word;

obtaining candidate recommendation words corresponding to the historical search result; and obtaining the recommendation word set matched with the second attribute tag from the candidate recommendation words.

12. The method according to claim 11, wherein obtaining the recommendation word set matched with the second attribute tag from the candidate recommendation words based on the second attribute tag comprises:

obtaining the recommendation word set matched with the second attribute tag from the candidate recommendation words based on the second attribute tag and interaction data for the candidate recommendation words.

13. The method according to claim 12, wherein obtaining the recommendation word set matched with the second attribute tag from the candidate recommendation words based on the second attribute tag and the interaction data for the candidate recommendation words comprises:

obtaining a candidate recommendation word set matched with the second attribute tag from the candidate recommendation words;

determining recommendation parameters for the candidate recommendation words in the candidate recommendation word set based on the interaction data for the candidate recommendation words; and obtaining the recommendation word set from the candidate recommendation word set based on the recommendation parameters of the candidate recommendation words in the candidate recommendation word set.

14. The method according to claim 13, wherein the interaction data comprises a search frequency, a search time period, and/or a browse behavior.

15. An electronic device, comprising:

one or more processors; and a storage apparatus, configured to store one or more programs, wherein the one or more programs, when run by the one or more processors, cause the one or more processors to receive a search word, and present, on a search result page, a first search result corresponding to the search word under a first attribute tag, wherein the search result page comprises a plurality of attribute tags, and an attribute of the first search result is matched with the first attribute tag;

in response to a switching operation for the attribute tags, present, on the search result page, a second search result corresponding to the search word under a second attribute tag, wherein an attribute of the second search result is matched with the second attribute tag; and in response to a triggering operation for a search box on the search result page, present a recommendation word set on a search intermediate page, wherein the recommendation word set is determined based on the search word and the second attribute tag;

wherein the recommendation word set is determined based on a first recommendation word set corresponding to the search word and a second recommendation word set corresponding to the second attribute tag, which comprises:

obtaining, based on the second attribute tag, a first recommendation word subset from the first recommendation word set, and a second recommendation word subset from the second recommendation word set, wherein recommendation words in the first recommendation word subset and the second recommendation word subset are matched with the second attribute tag; and processing and splicing the recommendation words in the first recommendation word subset and the second recommendation word subset to obtain the recommendation word set.

16. The electronic device according to claim 15, wherein the recommendation word set is determined based on the search word and the second attribute tag, which comprises:

determining an extension word based on the second attribute tag; and performing splicing combination on candidate recommendation words corresponding to the search word, and the extension word, and generating target recommendation words to obtain the recommendation word set.

17. The electronic device according to claim 15, wherein the recommendation word set is determined based on a first recommendation word set corresponding to the search word and a second recommendation word set corresponding to the second attribute tag, which comprises:

obtaining, based on the second attribute tag, a first recommendation word subset from the first recommendation word set, and a second recommendation word subset from the second recommendation word set, wherein recommendation words in the first recommendation word subset and the second recommendation word subset are matched with the second attribute tag; and processing and splicing the recommendation words in the first recommendation word subset and the second recommendation word subset to obtain the recommendation word set.

18. The electronic device according to claim 15, wherein the one or more processors being caused to, in response to the triggering operation for the search box on the search result page, present the recommendation word set on the search intermediate page comprises being caused to:

in response to a trigger for a focus of the search box on the search result page, present the recommendation word set on the search intermediate page; or in response to a deletion of the search word from the search box on the search result page, present the recommendation word set on the search intermediate page; or in response to a trigger for a target control corresponding to the search box on the search result page, present the recommendation word set on the search intermediate page.

19. The electronic device according to claim 15, wherein the one or more processors are further caused to:

in response to a triggering operation for any target recommendation word in the recommendation word set, present, on the search result page, a target search result matched with the target recommendation word and the second attribute tag; or in response to a triggering operation for any target recommendation word in the recommendation word set, present, on the search result page, a target search result matched with the target recommendation word, wherein the target search result comprises third search results corresponding to the target search word under different attribute tags, and a presentation priority of a search result, having an attribute tag matched with the second attribute tag, among the third search results is higher than a presentation priority of a search result, having an attribute tag not matched with the second attribute tag, among the third search results.

\* \* \* \* \*